United States Patent [19]

Kapasi et al.

[11] 4,053,669
[45] Oct. 11, 1977

[54] IMITATION SHEET MATERIAL WITH SURFACE GRAIN APPEARANCE

[75] Inventors: Vikram C. Kapasi, Chelmsford; Henry R. Lasman, Andover, both of Mass.; Robert J. Lebenson, Northampton, N.H.; Reuben Wisotzky, Lexington, Mass.

[73] Assignee: Pandel-Bradford, Inc., Lowell, Mass.

[21] Appl. No.: 679,142

[22] Filed: Apr. 22, 1976

Related U.S. Application Data

[63] Continuation of Ser. No. 460,127, April 11, 1974, abandoned.

[51] Int. Cl.² .............................................. D06N 3/04
[52] U.S. Cl. ..................................... 428/151; 428/195; 428/212; 428/246; 428/284; 428/315; 428/904; 427/257; 427/264; 156/85; 156/183; 156/221
[58] Field of Search ................. 156/242, 85, 232, 235, 156/239, 245, 246, 274; 264/41, 49, 321, 282, 216, 293, 45; 428/151, 152, 155, 195, 409, 217, 246, 284, 212, 904, 320, 315; 427/245, 385

[56] References Cited

U.S. PATENT DOCUMENTS

| | | | |
|---|---|---|---|
| 2,587,594 | 3/1952 | Charannes et al. | 156/247 |
| 2,982,670 | 5/1961 | Jeff | 428/151 |
| 3,262,805 | 7/1966 | Aoki | 428/151 |
| 3,598,687 | 8/1971 | Elie | 156/72 |
| 3,677,871 | 7/1972 | Oohara | 428/151 |
| 3,821,012 | 6/1974 | Lattarulo et al. | 428/151 |

FOREIGN PATENT DOCUMENTS

| | | | |
|---|---|---|---|
| 4,620,155 | 7/1971 | Japan | 428/151 |

Primary Examiner—George F. Lesmes
Assistant Examiner—Stanley S. Silverman
Attorney, Agent, or Firm—Richard P. Crowley

[57] ABSTRACT

An embossed plastic sheet material having a surface design effect thereon, and the process of preparing such material which comprises: applying to compressed areas of an embossed release sheet having a design effect thereon a first polymer characterized by a high modulus of elongation; applying a continuous layer of a second polymer characterized by a low modulus of elongation over the first polymer in the depressed areas; removing the release sheet to provide a polymeric sheet material composed of a continuous layer of a low modulus polymer, with raised areas composed of a high modulus polymer secured thereto, the raised areas of the high modulus polymer forming a substantial part of the sheet surface; and flexing the low modulus polymer in the intervening low areas between the raised high polymer areas to the polymeric sheet to form a weak-hinge effect, thereby providing an imitation leather-type material with an accentuated design effect thereon.

11 Claims, 7 Drawing Figures

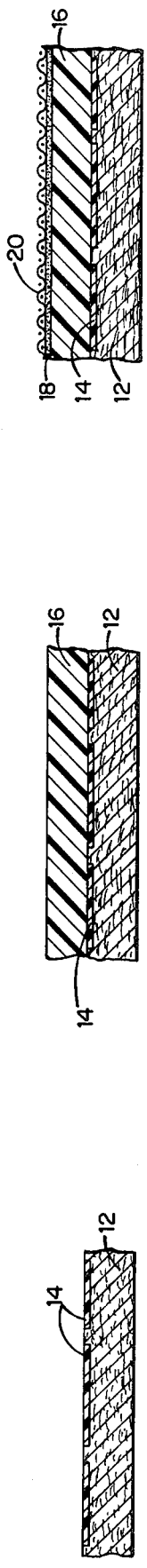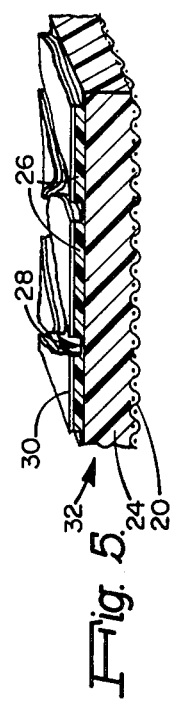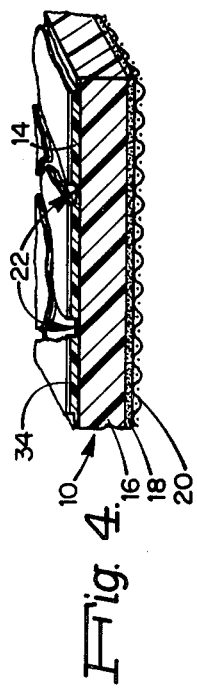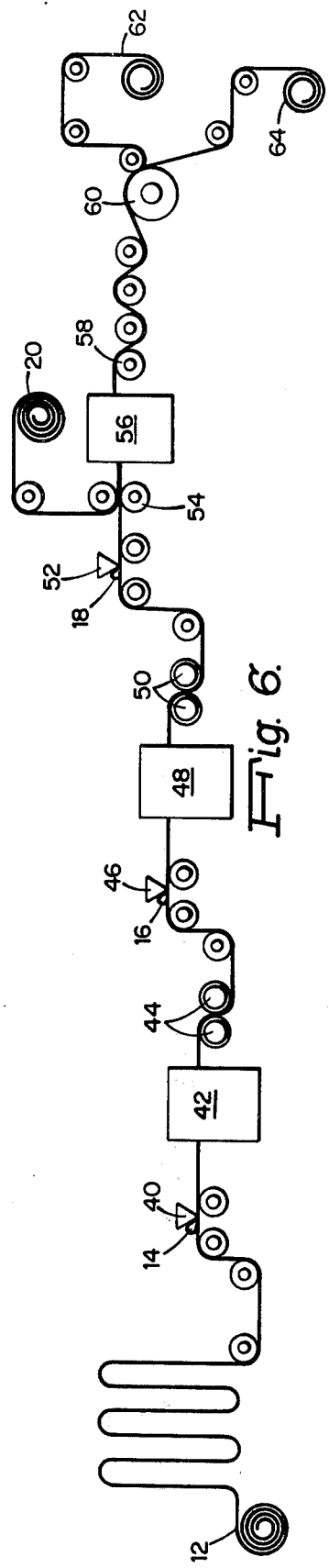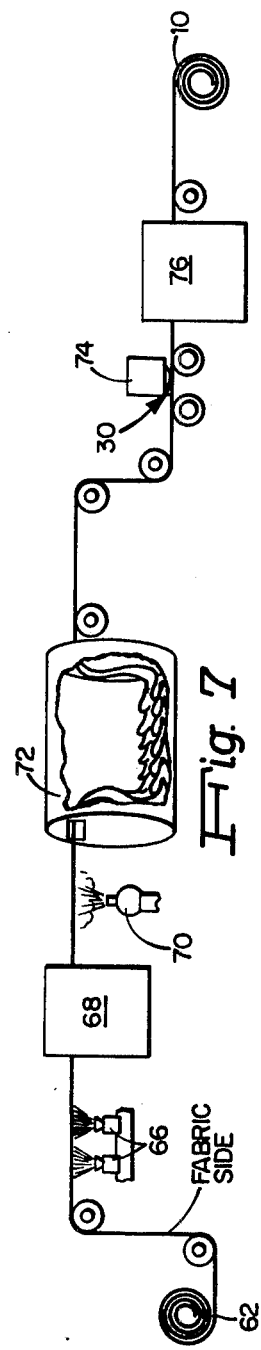

IMITATION SHEET MATERIAL WITH SURFACE GRAIN APPEARANCE

This is a continuation of application Ser. No. 460,127, filed Apr. 11, 1974 now abandoned.

BACKGROUND OF THE INVENTION

Sheet materials made with polymers and having an embossed grain-like or other surface design have been prepared in the past by a number of methods. Polymeric imitation leather sheet materials have been prepared, for example, by casting directly onto a pre-embossed release paper a polymeric material and then stripping the paper from the polymer surface. Surface designs produced by this method generally exhibit extremely shallow and nondistinctive grain designs. Another technique has been to employ a more deeply pre-embossed release sheet to obtain a more distinctive grain effect; however, air is often entrapped in the valley areas and the valley areas become distorted in appearance. A further method has been to embosse a grain-like surface design under heat and pressure onto a polymeric sheet material. This method usually compresses the polymeric layer into the nap or open spaces of the supporting fabric sheet, resulting in a product which often exhibits unsatisfactory hard, drape and break properties. Accordingly, there exists a need for a sheet material with an enhanced grain appearance which exhibits satisfactory leather-like properties, and to a method for preparing such material.

SUMMARY OF THE INVENTION

Our invention concerns a new and unique sheet material characterized by a raised design on the surface thereon and the method of preparing such material. In particular, our invention relates to an imitation leather-type sheet material in which the grain of the material has been accentuated and to the method of preparing such material, which includes a combination of polymers having a different modulus of elongation so as to form a material having a weak hinge therein.

We have discovered that a sheet material, such as an imitation leather-type material, or other material, which has a raised surface design effect thereon may be prepared, which material is characterized by an accentuated surface design. In our material, the intervening low areas form a "weak hinge" relative to the raised areas of the design, thereby accentuating the surface design, and providing a material with a leather-like surface appearance and properties without many of the disadvantages of the prior techniques.

In our discovery, a combination of steps and polymeric materials is used, each of which materials is characterized by a difference in the modulus of elongation. We have found that a difference between such polymers of at least about 800 psi. and often more; for example, 500 to 2500 psi., is required. The modulus of elongation as referred to herein is the force in pounds per square inch (psi.) required to provide a 100% elongation of the polymer at 25° C, as more fully set forth in specification ASTM D-412-D.

A wide variety of natural and synthetic polymers, such as those presently used in preparing sheet materials, may be employed as the polymeric material in preparing our sheet material, subject only to the essential requirements of the differences in the modulus of elongation as set forth herein. The preferred and typical polymers employed in the practice of our invention include, but are not limited to, liquid compositions containing vinylhalide resins, such as polyvinyl chloride and copolymers of vinyl chloride, such as vinyl chloride/vinyl acetate resins and similar type resins, and flexible urethane coating-type resins. These polymers and resins, as well as others used to prepare supported flexible polymeric coated sheet materials, may be used alone or in combination, either as the high or low modulus polymers.

The modulus of elongation of the polymers and polymeric liquid compositions employed, whether as organosols, plastisols, solutions, hot melts, emulsions or the like, may be altered by the selection of the particular polymers, as well as by the use of various additives, plasticizers, solvents, diluents, fillers, modifiers, oils, monomers, polymers and other materials.

In our process, a first polymer characterized by a high modulus of elongation of not less than 800 psi., and often greater than 2000 psi., from the polymer of low modulus of elongation, and typically having a 100% elongation of from about 2000 to 8000; e.g., of 4000 to 6000 psi., is applied into the depressed areas of a release sheet, such as a preembossed paper release sheet, having a design effect therein which is desired in the ultimate sheet. This first polymer thus forms a discontinuous layer within the depressed areas of the release sheet, and is typically quite thin from about 0.01 to 0.50 mils.; for example, 0.05 to 0.1 mils. This discontinuous layer of a first polymer may be applied by the technique known as "spanishing".

A continuous layer of a second polymer characterized by a low modulus of elongation, such as, for example, from about 300 to 3000 psi., e.g., 500 to 1000 psi., is then applied, for example, by casting, coating, laminating, etc., over the first polymer. The first polymer is formed of a solid polymer, but the second polymer in the continuous layer may be a flexible cellular, cellular-forming on expansion, or noncellular; that is, a solid flexible, layer. The first and second polymers may be hardened, cured, fused, gelled or otherwise formed separately or together, such as by the application of heat, the evaporation of solvents, curing or other techniques. Of course, if desired, a series of first polymers the same or different in composition, elongation and type and color may be used one over the other, or in different areas of the embossed release sheet to provide multiple and different coating layers and design effects. The first polymer should be secured and bonded to the second polymer.

The release sheet is then stripped from the surface of the first and second polymers to provide a polymeric sheet composed of a continuous layer of the low modulus second polymer, and with slightly raised areas composed of the high modulus polymer bonded or secured thereto. The raised areas usually form a major part of the sheet surface area; for example, over 50%, such as from about 80 to 95% of the sheet surface area, as would be represented by the raised portions for grain of natural leather. If desired and as will be illustrated, the second polymer layer may be a foam layer. Optionally, the second polymer layer may be placed on a flexible substrate, such as a supporting sheet material like a fibrous sheet such as a woven or nonwoven sheet or mesh-like grid or screen material. The substrate sheet may be secured to the second polymer, such as by laminating to the surface of the second polymer layer to provide for a supported sheet material.

In the sheet product, the intervening low areas between the raised areas of the first polymer are composed of the second polymer having the low modulus. The slightly raised surface of the high modulus polymer is then accentuated by multiple flexing of the sheet material in the low intervening areas, so as to form a "weak hinge" effect which accentuates the raised areas. The flexing of the hinge area to form a weak hinge also makes the polymeric sheet loose and crinkled, such as a leather-type material or more natural-looking material, and may be effected by various actions, either alone or in combination.

Flexing may be carried out by subjecting the polymeric sheet; for example, either before, but preferably after, the removal of the release paper, to a mechanical flexing action or by a series of shrinkage and expansion steps. For example, with a natural woven fabric supported material, like a jute or cotton woven fabric, a shrinking action may be effected by using water sprays and/or wet steam combined with heat to cause a shrinking and expansion of the substrate material, thereby flexing and weakening the hinge in the hinge area during such actions. Where the supporting sheet is composed of a heat-shrinkable polymeric material, heat alone may be employed to flex the sheet. In another technique, a mechanical action may be used to flex the low modulus polymer in the hinge areas, such as by tumbling folds of the polymeric sheet material, for example, in an oscillating-type tumbler varying from about 90° to 220°. Tumbling of the sheet material occurs with the material in overlapping folds inside a cylindrical-type tumbler while subject to heat and moisture, with often the only pressure applied being that of the material falling on itself. If desired, such mechanical action may include the use of additional dunnage or ballast material, such as bundles, bales or balls within the tumbler. Other mechanical techniques would include passing the material in reverse directions over a series of bars or small diameter rolls, etc. Other types of actions effect a weak hinge and fracture in the low areas and may be used, such as chemical techniques like the use of solvents to soften preferentially the weak hinge area or varying formulations.

After formation of the weak hinge, the differences in the surface design effects may be further enhanced by applying a clear or pigmented printing ink or other top coating on the raised areas. The purpose of the flexing action is to subject the low modulus polymer to a flexing or fractioning action in the low areas. As described, a number of polymers may be used in the practice of our invention, but typically the continuous layer of the low modulus polymer is a flexible polymer, while the raised areas of the high modulus polymer are composed of harder-type resins, alone or in combination, such as semirigid PVC, vinyl chloride resins, hard PVC resins, acrylic resins, cellulosic such as cellulose acetate butyrate, nitrocellulose and other polymers.

The high and low modulus polymers should be selected so that they are compatible and bonded to each other, or when they are uncompatible, an adhesive tie coat may be employed. In one preferred embodiment, the hard and soft polymers are aliphatic, flexible, coating-type urethane resins. The urethane resins are typically applied in liquid-solvent compositions. In another embodiment, the resins may be vinyl chloride resins of different molecular weight or homo or copolymer compositions to obtain the difference in modulus of elongation. The vinyl chloride resins are usually employed as liquid plastisol or organosol compositions, and are cast and heated to gel and then fuse the resins. Where desired, the vinyl chloride resins used for the continuous layer of low modulus resin may contain a blowing agent to obtain on heating a cellular foam layer.

Our invention, for the purposes of illustration only, will be described in connection with the preparation of an imitation plastic-supported leather sheet material having a grain style surface design effect thereon, and employing a combination of urethane resins.

BRIEF DESCRIPTION OF THE DRAWINGS

FIGS. 1-3 are fragmentary enlarged cross-sectional views of sheet materials during various stages of the process of preparation.

FIG. 4 is a fragmentary cross-sectional partially isomeric view of a sheet material of our invention as prepared by the process set forth in FIGS. 6 and 7.

FIG. 5 is a fragmentary cross-sectional partially isomeric view of a modification of the sheet material of our invention.

FIGS. 6 and 7 represent a schematic diagrammatic illustration of a process of preparing the imitation-like leather material of FIG. 4.

DESCRIPTION OF THE EMBODIMENTS

With reference to FIG. 6, there is shown an embossed paper release sheet 12 and the coating into the depressed areas of the embossed sheet of a first polymer composed of a urethane resin 14 having a high modulus of elongation through the use of a knife coater 40, with a thickness of the first polymer of about 0.2 to 0.5 mils. (dry). The hardening of the solvent urethane resin composition in a two-zone hot air oven 42 at temperatures of about 80° to 350° F provides a product as illustrated in FIG. 1. The sheet is then passed through a pair of cooling rolls 44, and subsequently a second polymer composed of a urethane resin coating solution 16 is applied over the areas 14 in a continuous layer through the use of a knife coater 46. The sheet is then directed to a two-zone oven 48 at temperatures generally as before, and then passed through a pair of cooling rolls 50 to obtain the product as illustrated in FIG. 2, with the second polymer layer of about 1 to 3 mils. (dry) in thickness.

A thin layer (e.g., 5 to 12 mils, wet) of an adhesive 18 is knife-coated with knife coater 52 onto the surface of the second polymer layer 16, and a woven fabric sheet 20, such as a woven cotton sheet, is then pressed through opposing rolls 54 into contact with the surface of the wet coated layer of adhesive, and the sheet passed through oven 56 at a temperature of from about 100° to 350° to laminate the woven sheet 20 to the surface of the polymer layer 16. The laminate product emerging from the oven 50 moves through cooling and takeup rolls 58 and is illustrated in FIG. 3. The laminate is then moved to a stripping station 60 wherein the release paper 12 is stripped and directed to windup roll 64 while the woven laminate sheet is directed to windup roll 62.

With reference to FIG. 7, the woven laminate sheet 62 is then processed to flex the intervening low areas between the raised areas of polymer 14 and the low modulus polymer layer 16; that is, the intervening areas presenting the grain of the imitation leather design. FIG. 7 illustrates a process whereby a combination of techniques is employed to accentuate the raised areas and to fraction and flex the low areas to form a weak-hinge effect. FIG. 7 illustrates forming a weak hinge by heat-shrinking of the sheet material 62, followed by an oscillating tumbling motion. In FIG. 7, the coated fabric roll 62 has the underlying fabric portion thereof wet by water spray 66, and, thereafter, the coated sheet 62 is passed through an infrared oven 68 to effect a partial drying with shrinkage of the fabric 20, and resulting in flexing of the intervening low areas. On emerging from the oven, the underside of the fabric is then sprayed with wet steam 70, and, thereafter, is directed to a cylindrical oscillatory-type tumbler device 72. The tumbler device 72 provides for approximately 180° oscillation about its cylindrical axis so that the fabric material 62 within the tumbler folds over on itself. Typically, 30 to 60 yards of the multiple-folded coated sheet 62 may be in the tumbler at one time, with a throughput speed of 10 to 20 yards per minute. The tumbler 72 is heated so that the coated fabric material 62, as it folds back and forth on itself in the tumbler in the presence of moisture and heat, provides for continued fracture of the low intervening areas of the second polymer 16, and yields a "weak hinge" effect, such that the raised areas are accentuated. Typically, the relative humidity in the tumbler 72 ranges from about 40 to 100%; for example, about 60-80%, at a temperature of from about 85° to 200° F; e.g., 100 to 160° F. If desired, bales of fabric material, medicine balls, etc., may be added to the tumbler. The coated fabric material 62 is then removed from the tumbler and passed through a Gravure roller coating station wherein a printing layer or top coat, such as a clear urethane resin top coat 34, is placed on the raised areas to accentuate further the grain, and then passed through an oven 76, with the final product 10 recovered in a windup roll.

The final product of the process described in FIGS. 6 and 7 is illustrated in FIG. 4 which includes the woven fabric supporting sheet 20, the thin adhesive tie layer 18 laminating the sheet to the continuous layer of the low modulus polymer 16, with the raised grain areas represented by the high modulus polymer 14 and intervening low areas with a weak hinge that has been flexed 22 with the clear top coat 34 to accentuate further the raised areas.

A modification of the plastic embossed product shown in FIG. 4 is illustrated in FIG. 5 wherein the sheet 32 contains a woven fabric 20 and a continuous polymeric layer of low modulus polymer comprising, for example, a flexible cellular vinyl chloride resin foam 24, with raised embossed areas 26 composed of a high modulus vinyl chloride resin, with the intervening low areas, the weak-hinge effect 28 and a clear top coat 30 over the raised areas. In this modification, a foam cellular layer is substituted for the solid flexible urethane layer as more particularly described. If desired, the foam layer 24 may be formed from a vinyl chloride plastisol containing a blowing agent, such as azodicarbonamide, and the sheet substrate laminated or bonded onto the top of the layer in the gel state prior to fusing, so that the intermediate adhesive layer 15 as shown in FIG. 4 may be eliminated.

Typical urethane formulations which have been employed in preparing the product illustrated in FIG. 4 by the process of FIGS. 6 and 7 are shown in Table I.

TABLE I

| A. First Polymer | |
|---|---|
| Clear aliphatic polyester urethane elastomer | 100 parts |
| Pigment dispersion | 7 parts |
| Methyl cellosolve added as required | |
| Viscosity cps 12,000 at 72° F | |

TABLE I-continued

| B. Second Polymer | |
|---|---|
| Clear aliphatic polyester urethane elastomer | 100 parts |
| Pigment dispersion | 7 parts |
| Silicone surfactant | 2 parts |
| Methyl cellosolve : xylol (1:1) as required | |
| Viscosity cps 5000 at 72° F | |
| C. Adhesive Coat | |
| Clear aromatic polyester urethane elastomer | 100 parts |
| Pigment dispersion | 7 parts |
| Dimethyl formamide : toluol : methylethyl ketone (1:1:1) as required | |
| Viscosity cps 16,000 to 18,000 at 72° F | |

The physical properties of the polymers employed above are set forth in Table II.

TABLE II

| | PHYSICAL PROPERTIES | | |
|---|---|---|---|
| Polymer | A | B | C |
| Tensile strength PSI (ASTM-D-412) | 6–7,000 | 5550 | 7500 |
| % Elongation (ASTM D-412) | 120 | 390 | 620 |
| Tensile modulus (PSI) (ASTM-D-412) | | | |
| 100% | 5–6,000 | 725 | 685 |
| 200% | — | 1700 | 1000 |
| 300% | — | 3800 | 1940 |

As illustrated, the hard first and the soft second polymers differ in modulus of elongation in psi. at 100% by about 435300 psi.

Our invention has been described in certain embodiments; however, modifications, changes and alterations of these embodiments may be made and will be apparent to persons skilled in the art.

What we claim is:

1. A substitute leather sheet material characterized by an accentuated surface design effect thereon, which sheet material comprises:
    a. a flexible, fibrous, base-supporting sheet material;
    b. a continuous, flexible, first layer of a solid thermoplastic polymer characterized by a low modulus of elongation in psi at 100% elongation, the first layer secured to the base sheet material;
    c. a discontinuous second layer of a solid thermoplastic polymer characterized by a high modulus of elongation in psi at 100% elongation of from about 2000 to 8000 psi, the second layer secured to the first layer, and forming raised areas of a surface design on the surface of the continuous layer;
    d. the low and high-modulus polymers of the first and second layers having a difference of the modulus of elongation of at least 800 psi between the low and high-modulus polymers;
    e. the second layer disposed in a predetermined manner over the entire surface of the first layer, and forming valley areas between the respective discontinuous second layer, which valley areas represent a pattern imitation of a predetermined design; and
    f. the solid thermoplastic polymer of the first layer beneath the valley areas which form the surface pattern characterized by flexible, weak-hinge properties relative to the remaining portion of the solid first layer, said properties derived by repetitive flexing of the low-modulus polymer of the first layer in the areas beneath the valley areas to fracture and weaken the mechanical strength of the low-modulus polymer in such areas, thereby providing a material having an enhanced surface design effect thereon.

2. The material of claim 1 wherein the sheet material is a fabric subject to shrinkage and expansion by the action of heat or moisture.

3. The material of claim 1 wherein the low-modulus polymer has a modulus of elongation of from 300 to 3000 psi.

4. The material of claim 1 wherein the high-modulus polymer has a modulus of elongation of from about 4000 to 6000 psi.

5. The material of claim 1 wherein the thickness of the first layer is from about 1 to about 3 mils.

6. The material of claim 1 wherein the polymers are selected from the group of polymers of vinyl-halide resins, urethane elastomers and combinations thereof.

7. The material of claim 1 wherein the surface of the second discontinuous layer includes a thin polymeric top coating layer thereon.

8. The material of claim 1 wherein the total surface area of the second discontinuous layer comprises over about 80% of the total surface area of the first layer.

9. The material of claim 1 wherein the difference in modulus of elongation between the low and high-modulus polymers is from about 1500 to 2500 psi.

10. The material of claim 1 wherein the second layer has a height of from about 0.01 to about 0.5 mils.

11. A substitute leather sheet material characterized by an accentuated imitation leather grain surface design effect thereon, which material comprises:
  a. a flexible, woven, base-supporting sheet material, which sheet material is subject to shrinkage and expansion by the action of heat or moisture;
  b. a continuous, flexible, first layer of a solid thermoplastic polymer characterized by a low modulus of elongation in psi at 100% of from about 300 to 3000 psi, the first layer secured to the base sheet material;
  c. a discontinuous second layer of a solid thermoplastic polymer characterized by a high modulus of elongation in psi at 100% elongation of from about 2000 to 8000 psi, the second layer secured to the first layer, and forming raised areas of an imitation grain effect leather surface design on the first layer surface;
  d. the difference of modulus of elongation between the low and high-modulus polymers being at least about 800 psi,
  e. the polymers selected from the group of polymers of vinyl-halide resins, urethane elastomers and combinations thereof;
  f. the second layer disposed over the entire sheet surface of the first layer in a predetermined design pattern, the second layer comprising from over about 80% of the total surface area of the first layer, and forming low valley areas between the discontinuous layer, representing a pattern imitative of a leather-like grain surface;
  g. the second layer having a height of from about 0.01 to 0.5 mils, and greater than the thickness of the first continuous layer; and
  h. the solid thermoplastic polymer of the first layer beneath the valley areas which form the surface pattern characterized by flexible, weak-hinge properties relative to the remaining portion of the solid first layer, said properties derived by repetitive flexing of the low-modulus polymer of the first layer in the areas beneath the valley areas to fracture and weaken the mechanical strength of the low-modulus polymer only in such areas, thereby providing a material having an enhanced surface design effect thereon.

* * * * *